L. A. ASPINWALL.
FARM IMPLEMENT AND THE LIKE.
APPLICATION FILED FEB. 4, 1919.
1,319,504.
Patented Oct. 21, 1919.
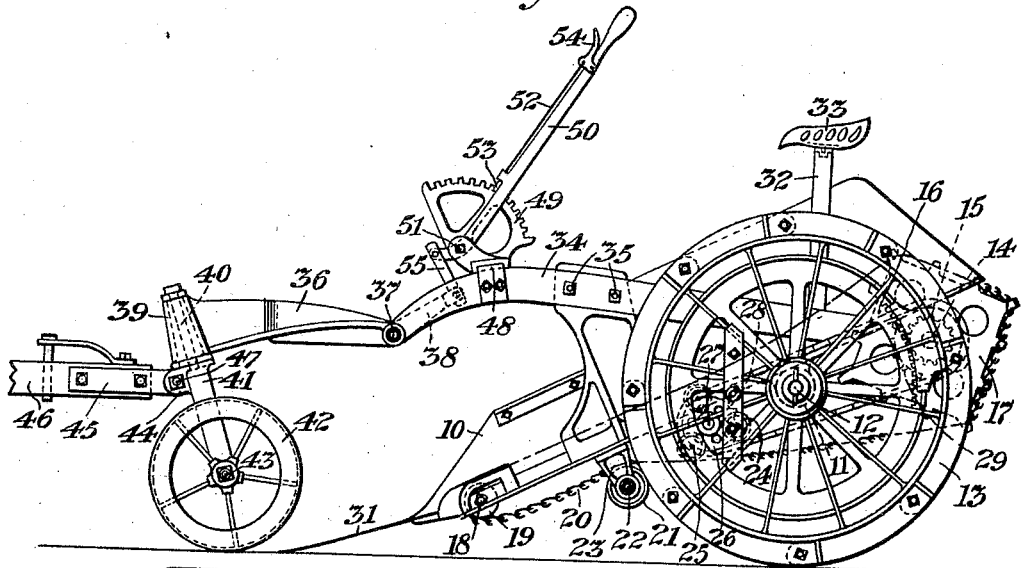
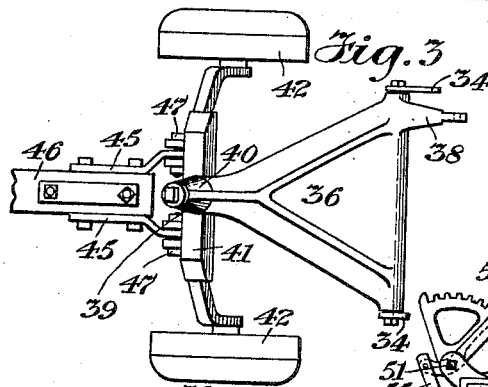
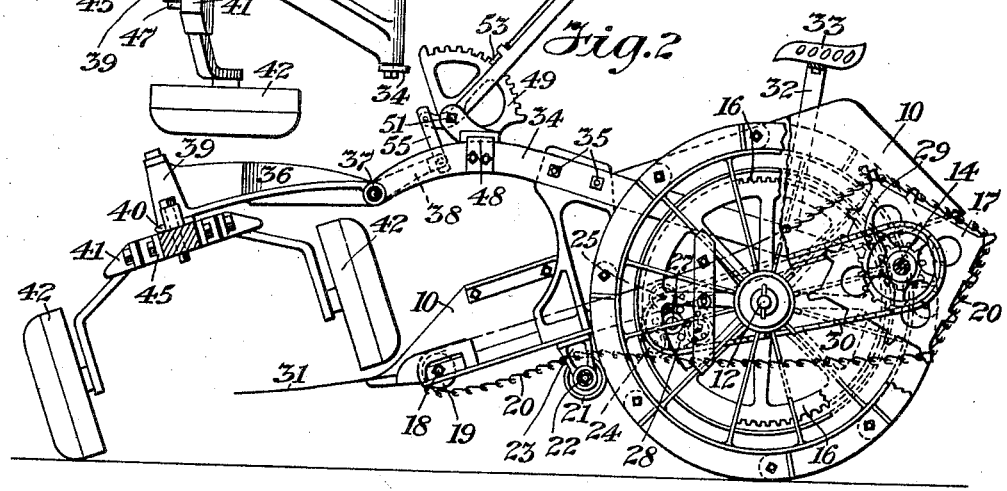
INVENTOR
Lewis Augustus Aspinwall
BY
HIS ATTORNEYS

UNITED STATES PATENT OFFICE.

LEWIS AUGUSTUS ASPINWALL, OF JACKSON, MICHIGAN, ASSIGNOR TO ASPINWALL MFG. CO., A CORPORATION OF MICHIGAN.

FARM IMPLEMENT AND THE LIKE.

1,319,504. Specification of Letters Patent. Patented Oct. 21, 1919.

Application filed February 4, 1919. Serial No. 274,874.

*To all whom it may concern:*

Be it known that I, LEWIS AUGUSTUS ASPINWALL, a citizen of the United States, residing at Jackson, in the county of Jackson and State of Michigan, have invented an Improvement in Farm Implements and the like, of which the following is a specification.

This invention relates to a farm implement or similar apparatus, and more particularly to the construction of the frame and forward truck thereof, the object being to so construct and mount the truck in the frame that the parts are adjustable relatively to one another and the truck is movable so that in turning the same, the weight of the implement is thrown on the forward truck wheel and the rearward truck wheel is raised so as to clear a plow or other tool mounted in and carried by the frame of the apparatus in the lower forward part thereof. The construction is such that the length of the implement may be appreciably shortened and in which at the same time it is possible to make extremely short turns without interfering with the plow or tool carried in the frame. It will be understood that the invention is applicable to various forms of farm implements and as herein illustrated and described, I have shown the same as applicable to a potato digger.

The features forming the present invention will be hereinafter more particularly described in conjunction with the accompanying drawings in which,—

Figure 1 is a side elevation of a potato digger in which my invention is embodied.

Fig. 2 is a side elevation and partial section showing the front wheels turned at right angles to the position shown in Fig. 1, and Fig. 3 is a plan view of the truck member.

Referring particularly to the drawings in which I have illustrated the elevator conveyer type of potato diggers, the apparatus preferably comprises side members 10 which are suitably connected and braced so as to maintain their respective positions relatively to one another. In each side member 10 there is a bearing 11 in which an axle 12 is journaled. On the axle 12 traction wheels 13 are mounted. At the rear of the side members 10, the same are provided with bearings in which a shaft 14 is journaled. On this shaft 14 there is a gear 15 and this gear 15 meshes with a gear 16 which is secured on the axle 12 or to one of the traction wheels 13, or as will be understood, the gear 16 may be suitably connected to both the axle and the traction wheel.

On the shaft 14 immediately within the side members 10 sprockets 17 are secured. These sprockets as illustrated in the drawing are preferably square for the purpose hereinafter indicated, although as will be understood, they may be of any other configuration. At the forward end of the side members 10 in similar positions there are bearings in which stub shafts 18 are journaled. On the stub shafts 18 immediately within the side members there are rollers 19. The rollers 19 and the sprockets 17 carry and actuate a conveyer 20 which as described in my copending application is preferably composed of rods which are provided with hooks at their respective ends so that each rod may be linked to the next adjacent rod by the said hooks, and in which rods there may be provided curved or waved corrugated portions preferably in staggered positions. In order to maintain the lower portion of the conveyer in a sufficiently elevated position, I may also employ idlers 21 which are secured on a shaft 22 journaled in brackets 23 which are suitably secured to the side members 10.

The purpose of employing the square sprockets 17 is to raise and lower the upper or working portions of the conveyer in carrying the potatoes upwardly and at the same time agitate and loosen the earth therefrom, and in addition to thus agitating the upper or working portion of the conveyer, I may also employ auxiliary agitating devices which preferably comprise a series of rollers 24 each mounted on a pin 25 which is fixed in a disk 26 carried by a shaft 27, the shaft 27 being journaled in bearings provided therefor in the side members of the digger. The shaft 27 is driven by means of a sprocket 28 mounted thereon, and a sprocket 29 mounted on the shaft 14, a chain 30 passing over the sprockets 28 and 29 for this purpose. As is usual in potato diggers of this class, a plow 31 is also secured at the forward end of the side members, and the frame of the digger is also provided with a post 32 carrying a seat 33 for the driver. The parts of the digger hereinbefore described are substantially the same as those shown and described in my copending application.

The parts of the apparatus to which the present invention more particularly relates are the means for swinging the frame to raise and lower the plow and the construction of the front or truck member to make it possible to effect a short or sharp turn without bringing the front wheels into contact with the plow. Connected to the upper front portions of the side members 10 there are truss bars 34, these are secured in position by suitable bolts 35 or otherwise. 36 designates a swivel plate which at its rearward end is pivotally connected between the forward ends of the truss bars 34 as indicated at 37. At one side the swivel plate 36 is provided with an arm or extension 38 lying adjacent one of the truss bars 34. At the forward end, the swivel plate 36 is fitted with a head 39 placed at an angle to the vertical when the truss bars are in any of their operative positions, and in this head 39 is a bore or bearing adapted to receive the shank 40 of a yoke axle 41, at the extremities of which the front wheels 42 are mounted on trunnions 43 or otherwise and suitably secured in position. The yoke axle 41 is also provided with lugs 44 adapted to receive connecting plates 45 to which a draft bar 46 is suitably connected. The connecting plates 45 are preferably pivoted in the lugs 44 by pins 47 or otherwise, so that the plates may swing on the pins as pivot points in the lugs 44.

On the truss bar 34 adjacent to which the arm 38 is made to lie, I prefer to employ a bracket 48 mounted on which there is a toothed quadrant 49. Associated with the quadrant is a lever 50, the same being pivoted at 51 adjacent one end thereof and provided with a rod 52, a catch 53 adapted to engage with the teeth of the quadrant and which is actuated by a trip 54 and normally maintained in position with the catch in contact with the teeth of the quadrant by a suitable spring or otherwise. A link 55 extends between and is connected pivotally at one end to the end of the lever 50, and at the other end to the end of the arm 38.

Now as will be understood, by releasing the catch 53 and swinging the lever 50, the angle between the truss arms 34 and the swivel plate 36 may be adjustably determined.

In making this adjustment the frame is also swung on the axle 12 so that the plow may be raised and lowered to determine the depth of the cut. Also as will be apparent, due to the manner of tilting the head of the swivel plate so that the line of the shank and the yoke axle is at an angle to the vertical, it will be possible to turn the front wheels to the position indicated in Fig. 2 in which they are approximately at a 90° angle from the traction wheels so as to make as short a turn as possible, and in so doing, the weight carried by the yoke axle is all thrown upon the forward front wheel, and the rear front wheel turns free of the plow, or other implement carried in the forward end of the frame, that is, the yoke axle may be turned to this position without the rearward front wheel coming into contact with the plow, thus making it possible to effect the shortest or sharpest turn with the digger.

I claim as my invention:

1. In an apparatus of the class described, a frame, an axle and wheels upon which the frame is mounted, a swivel plate pivotally connected at the forward end of the frame, an axle revolubly mounted in the said swivel plate so that its axis of revolution is at an angle to the vertical, and wheels mounted on the last aforesaid axle so that when the same is turned in the swivel plate, the weight of the apparatus is thrown on the forward wheel and the rearward wheel is raised.

2. In an apparatus of the class described, a frame, an axle and wheels upon which the frame is mounted, a swivel plate pivotally connected at one end in the forward end of the frame, a head at the forward end of the swivel plate, the said head being at an inclination to the vertical, a front axle mounted to turn in the said head, and wheels mounted on the front axle so that when the said front axle is turned, the weight of the apparatus is thrown on the forward wheel and the rearward wheel is raised.

3. In an apparatus of the class described, a frame, an axle and wheels upon which the frame is mounted, a swivel plate pivotally mounted at the forward end of the frame, a head on the said swivel plate placed at an inclination so the upper portion thereof is forward of the lower portion thereof, a front axle pivotally mounted to turn in the said inclined head of the swivel plate, and wheels mounted on the front axle, so that when the front axle is turned, the weight of the apparatus is carried by the forward wheel and the rearward wheel is raised.

4. In an apparatus of the class described, a frame, an axle and wheels upon which the frame is mounted, a swivel plate pivotally mounted at the forward end of the frame, a head at the forward end of the swivel plate inclined so that its upper portion is forward of its lower portion, a yoke axle mounted to turn in the said inclined head of the swivel plate, wheels secured adjacent the extremities of the yoke axle, and means for pivotally connecting a draft pole to the said yoke axle so that when the yoke axle is turned, the weight of the apparatus is carried by the forward front wheel, and the rearward front wheel is raised.

5. In an apparatus of the class described, a frame, an axle and wheels upon which the frame is mounted, a swivel plate pivotally connected to the upper forward portion of the said frame, devices for swinging said swivel plate to raise and lower the forward part of the said frame, an inclined head on the swivel plate with the upper portion thereof forward of the lower portion, a front axle journaled to turn in the said inclined head of the swivel plate, and wheels mounted on the front axle so that when the front axle is turned, the weight of the apparatus is thrown on the forward front wheel and the rearward front wheel is raised.

6. In an apparatus of the class described, a frame having a tool mounted in the lower front portion thereof, an axle and wheels upon which the frame is mounted, a swivel plate pivotally mounted at the forward end of the frame, a head on the swivel plate placed at an inclination so that the upper portion is forward of the lower portion thereof, the front axle being pivotally mounted to turn in the said head of the swivel plate, and wheels mounted on the front axle so that when the said front axle is turned, the weight of the apparatus is carried by the forward wheel and the rearward wheel is raised sufficiently to clear the said tool.

7. In an apparatus of the class described, a frame having a tool mounted in the lower front portion thereof, an axle and wheels upon which the frame is mounted, a swivel plate pivotally mounted in the forward end of the frame, a head at the forward end of the swivel plate so inclined that its upper portion is forward of its lower portion, a yoke axle mounted to turn in the said inclined head of the swivel plate, wheels secured adjacent the extremities of the yoke axle, and means for pivotally connecting a draft pole to the said yoke axle so that when the yoke axle is turned, the weight of the apparatus is carried by the forward front wheel and the rearward front wheel is raised sufficiently to clear the said tool.

8. In an apparatus of the class described, a frame having a tool mounted therein in the lower front portion thereof, an axle and wheel upon which the frame is mounted, a swivel plate pivotally connected to the upper forward portion of the said frame, devices for swinging the said swivel plate to raise and lower the forward portion of the said frame and the tool mounted therein, an inclined head on the swivel plate with the upper portion thereof forward of the lower portion, a front axle journaled to turn in the said inclined head of the swivel plate, and wheels mounted on the front axle so that when the said front axle is turned, the weight of the apparatus is thrown on the forward front wheel and the rearward front wheel is raised sufficiently to clear the said tool.

Signed by me this 20th day of January, 1919.

LEWIS AUGUSTUS ASPINWALL.

Copies of this patent may be obtained for five cents each, by addressing the "Commissioner of Patents, Washington, D. C."